US009224373B2

(12) United States Patent
Vandendool

(10) Patent No.: US 9,224,373 B2
(45) Date of Patent: Dec. 29, 2015

(54) MUSICAL NOTATION SYSTEMS FOR GUITAR FRETBOARD, VISUAL DISPLAYS THEREOF, AND USES THEREOF

(71) Applicant: Studio Vandendool, Montréal (CA)

(72) Inventor: Mark Vandendool, Montréal (CA)

( * ) Notice: Subject to any disclaimer, the term of this patent is extended or adjusted under 35 U.S.C. 154(b) by 202 days.

(21) Appl. No.: 13/740,842

(22) Filed: Jan. 14, 2013

(65) Prior Publication Data

US 2013/0180383 A1 Jul. 18, 2013

Related U.S. Application Data

(60) Provisional application No. 61/585,911, filed on Jan. 12, 2012.

(51) Int. Cl.
*G09B 15/02* (2006.01)
*G10G 1/02* (2006.01)

(52) U.S. Cl.
CPC .................................... *G10G 1/02* (2013.01)

(58) Field of Classification Search
CPC .................................................. G10G 1/02
USPC .................................................. 84/477 R
See application file for complete search history.

(56) References Cited

U.S. PATENT DOCUMENTS

| | | | | |
|---|---|---|---|---|
| 3,741,066 | A | 6/1973 | Cromleigh | |
| 5,386,757 | A * | 2/1995 | Derrick | 84/473 |
| 5,644,096 | A * | 7/1997 | Bull | 84/485 SR |
| 6,127,616 | A | 10/2000 | Yu | |
| 6,239,344 | B1 * | 5/2001 | Prevost | 84/471 R |
| 6,407,323 | B1 | 6/2002 | Karapetian | |
| 6,927,331 | B2 | 8/2005 | Haase | |
| 7,332,665 | B2 | 2/2008 | Haney | |
| 7,579,542 | B2 * | 8/2009 | Pearlman | 84/473 |
| 7,982,115 | B2 | 7/2011 | Johnston | |
| 8,232,467 | B1 * | 7/2012 | Goldberg | 84/470 R |
| 2004/0182226 | A1 | 9/2004 | Dini | |
| 2008/0141848 | A1 | 6/2008 | Weitz | |
| 2011/0192270 | A1 | 8/2011 | Saxby | |

OTHER PUBLICATIONS

The Color Music Co., “Color Music” [online], [retrieved on Jan. 8, 2013]. Retrieved from the Internet <URL:http://www.mycolormusic.com/color-music/>, Published on Jul. 5, 2009.

Laia Clos, “Vivaldi’s Four Seasons Translated into Geometric Shapes and Colors” [online], [retrieved on Jan. 8, 2013]. Retrieved from the Internet <URL:http://www.tomedicions.bigcartel.com/>, Published on Jun. 21, 2011.

Restored, “Instructions for Playing” [online], [retrieved on Jan. 8, 2013]. Retrieved from the Internet <URL:http://www.restored.faithweb.com/ColorMusic_Sample_Page2.pdf>, Published on Jun. 2, 2010.

* cited by examiner

*Primary Examiner* — Jianchun Qin

(74) *Attorney, Agent, or Firm* — Bereskin & Parr LLP/S.E.N.C.R.L., s.r.l.

(57) ABSTRACT

There are provided visual displays for graphically showing on a visual representation of a guitar fretboard a location relationship between a given chord and its chord tones as well as for graphically showing on a visual representation of a guitar fretboard a location relationship between a given position and its scale tones. The present disclosure also relates to a method for visually expressing, on a visual representation of a guitar fretboard, the location relationship between a given chord, its chord tones and its scale tones, in a given key; a music notation method for representing a location relationship between a given chord, its chord tones and the scale tones of the scale to which said given chord belong, on a visual representation of at least a portion of a guitar fretboard; and visual display for expressing musical harmonic functions.

14 Claims, 18 Drawing Sheets
(7 of 18 Drawing Sheet(s) Filed in Color)

```
E --------------------------------------------------------------
B -------3----------3----------3----------3------------
G -------0-0--------0-0--------0-0--------0-0----------
D -----0----------0----------0----------0--------------
A ----2----------2----------2----------2---------------
E --3-------2--0-------2--3-------2--0-------2--------
```

MUSICAL NOTATION SYSTEMS FOR GUITAR FRETBOARD, VISUAL DISPLAYS THEREOF, AND USES THEREOF

CROSS-REFERENCE TO RELATED APPLICATIONS

The present application claims priority on U.S. provisional application No. 61/585,911 filed on Jan. 12, 2012. This application is incorporated herein by reference in its entirety.

FIELD OF THE DISCLOSURE

The present disclosure relates to the field of musical notation systems useful for guitar players. In particular, the present disclosure relates to a musical notation system for a guitar fretboard, a visual display for graphically showing on a visual representation of a guitar fretboard a location relationship between a given chord and its chord tones, a visual display for graphically showing on a visual representation of a guitar fretboard a location relationship between a given scale position and its scale tones, a music notation method for representing a location relationship between a given chord, its chord tones and its scale tones on a visual representation of at least a portion of a guitar fretboard, and a method for visually expressing, on a visual representation of a guitar fretboard, the location relationship between a given chord, its chord tones and its scale tones, in a given key.

BACKGROUND OF THE DISCLOSURE

Learning a musical instrument such like guitar can be quite a challenge. Such a challenge can be considered as even more important when it relates to learning the theoretical various aspects of music such as the mathematical relations of the notes, and the asymmetric alphabetical and solfege systems of music.

There are several difficulties that can be encountered with the conventional notation system and the tablature for the guitar. Firstly, there are multiple locations for a given note. For each note on the musical staff there can be up to five locations for it on the guitar (see FIG. 1)). Each note location is visually unique. On the piano there are only 12 unique notes, each visually obvious due to its location in relationship to the repeating pattern of black and white keys (see FIG. 2). On a guitar fretboard there are up to 144 unique notes that must be memorized, with almost no visual patterns to help. These two problems compound each other and make note location by letter name extremely difficult for beginners.

There are also further difficulties that can be encountered by guitar players concerning the classical notation system. For example, in the asymmetric lettering system, there are twelve notes in the western musical system, all of which are represented with only seven letters, from A to G. This creates asymmetric distance patterns between the letters, making these relationships necessary to memorize on a case by case basis.

A scale is a selection of seven notes out of the twelve, using one of every letter from A to G. These notes must follow a specific pattern of 'half-steps' and 'whole-steps' from any specific starting note. For example, a major scale starting on A would be A B C# D E F# G#, and starting on B would be B C# D# E F# G# A#. Since there are 15 different keys, each with 7 notes, a student must memorize 105 different pieces of information. A Chord is a specific selection of three notes out of the seven in the scale. Each scale has seven chords. Thus, at three notes per chord×seven chords per key×15 keys=305 items and note locations to memorize. Major, Minor and Diminished chords are created by changing the distance relationships between the three notes in the chord. Because of the asymmetric nature of the conventional system, these relationships are not alphabetically consistent. For example, if every other letter is picked twice from any starting point (A C E), a chord is created. In this case, the distances between A C and E create a minor chord. If C, E and G are chosen, even though the alphabetical relationships are the same, the uneven distribution of sharps (#) and flats (b) make this chord major, while the notes B D F create a diminished chord. B D# F# would create a major chord. These three basic qualities further complicate a beginners work.

For someone learning the classical notation system, there are no obvious theoretical information. To derive any theoretical information from notation, in terms of chord tones, scale degrees, harmonic function etc, a student must usually be very advanced, (for example, at least 3rd level conservatory theory, or university). This means all beginner students miss this extremely valuable part of the learning process, and this slows the speed of learning considerably because they lack the framework on which they will organize what they learn. Tablature is by far the most popular method that student guitarists use to learn music. Tablature provides only fret and string number information on a time axis. This allows the student to play the song only mechanically and only exactly as it's written down on that particular tablature. Like notation, this means the student has absolutely no understanding how the song is working theoretically and structurally. They will be unable to play the song in a different location on the guitar or in a different key. The nature of tablature drastically increases the amount of information the student must process to arrive at the same result. This makes the educational value of tablature extremely limited.

SUMMARY OF THE DISCLOSURE

According to one aspect, there is provided a visual display for graphically showing on a visual representation of a guitar fretboard a location relationship between a given chord and its chord tones, the visual display comprising:

a graphical representation of at least a portion of a guitar fretboard; and chord tone visual symbols, disposed on the at least a portion of the guitar fretboard, and designating chord tones of the given chord, the visual symbols comprising a first symbol designating a fundamental chord tone of the given chord, a second visual symbol designating a fourth overtone of the fundamental chord tone, a third visual symbol designating a second overtone of the fundamental chord tone.

According to another aspect, there is provided a visual display for graphically showing on a visual representation of a guitar fretboard a location relationship between a given position and its scale tones, the visual display comprising:

a graphical representation of at least a portion of a guitar fretboard; and scale tone visual symbols, disposed on the at least a portion of the guitar fretboard, and designating scale tones of the given position, the visual symbols comprising a first symbol designating a fundamental scale tone of the given position, a second visual symbol designating a third scale tone of the given position, a third visual symbol designating a fifth scale tone of the given position.

According to another aspect, there is provided a music notation method for representing a location relationship between a given chord, its chord tones and the scale tones of the scale to which the given chord belong, on a visual representation of at least a portion of a guitar fretboard, the method comprising:

assigning, to at least three chord tones of the given chord, predefined chord tone visual symbols comprising a first visual symbol designating a fundamental chord tone of the given chord, a second visual symbol designating a fourth overtone of the fundamental note, and a third visual symbol designating a second overtone of the fundamental note; and assigning, to the scale tones in the given position, predefined scale tones visual symbols comprising a fourth visual symbol designating the fundamental scale tone of the given position, a fifth visual symbol designating the third scale tone of the given position, a sixth visual symbol designating the fifth scale tone of the given position;

superimposing the chord tone visual symbols and the scale tones visual symbols in order to see the location relationship.

According to another aspect, there is provided a method for visually expressing, on a visual representation of a guitar fretboard, the location relationship between a given chord, its chord tones and its scale tones, in a given key, the method comprising:

assigning, to at least three chord tones of the given chord, predefined chord tone visual symbols comprising a first visual symbol designating a fundamental chord tone of the given chord, a second visual symbol designating a fourth overtone of the fundamental note, and a third visual symbol designating a second overtone of the fundamental note; and assigning, to the scale tones, predefined scale tones visual symbols comprising a fourth visual symbol designating the fundamental scale tone, a fifth visual symbol designating the third scale tone, a sixth visual symbol designating the fifth scale tone;

superimposing the chord tone visual symbols and the scale tones visual symbols in order to see the location relationship.

According to another aspect, there is provided a visual display for expressing musical harmonic functions comprising:

- a first circle, a second circle and a third circle forming a Venn diagram, wherein the first circle is assigned to tonic harmonic function and is filled with a first filling, the second circle is assigned to predominant harmonic function and is filled with a second filling, the third circle is assigned to dominant harmonic function and is filled with a third filling, and wherein the fillings are different from one another and their respective density or intensity gradually varies in an increasing manner in a direction from the central overlapping zone of the Venn diagram towards the outside of each of the circles; and
- a plurality of symbols designating chords, the symbols being inserted in the circles of the Venn diagram, thereby allowing for classifying the chords as a function of their harmonic function.

According to another aspect, there is provided a method for displaying chord tones on a visual representation of a guitar fretboard, said method comprising attributing a symbol for at least one chord tone of a given chord, said symbol comprising a shape and a color or a filling, wherein said symbol further comprises a number, a number of lines or number of dots written thereon or associated thereto that indicate a finger of a player to be used for playing that chord.

According to another aspect, there is provided a visual display for displaying chord tones on a guitar fretboard, said display comprises, at least one symbol attributed to at least one chord tone of a given chord, said symbol comprising a shape and a color or a filling, wherein said symbol further comprises a number, a number of lines or number of dots written thereon or associated thereto that indicate a finger of a player to be used for playing that chord.

It was found that by using the visual displays, the methods and the musical notation systems of the present disclosure, several drawbacks and difficulties of the prior art were overcome. The uniform nature of the guitar fretboard (no pattern of white and black keys) makes all relationships uniform, meaning that for example, there is no structural difference between any major chord or between any major scale. These relationships can be visually seen as visual symbols (such as colored shapes) on the fretboard, all of which are perfectly transposable (movable from key to key without changing shape). These shapes preserve all the theoretical information needed and allow the student to bypass the letter naming system all together, and instead use numbers. For example, both the A major scale and the B major scale mentioned under 'problems with classical notation' are now both described perfectly by the numbers 1 2 3 4 5 6 7 in the major scale shape, called a "scale position". Likewise the chords A C# E and B D# F# can both be described as chord I in their respective keys, allowing the student to play them both with the same chord shape, or "form", just in a different location on the guitar. Minor chords, or any other advanced type of chord or scale can then easily be seen as small deviations to specific parts of each form or position, rather than working through the letter naming distances, and then finding the letters on the fretboard. What this means, is that by learning the scale shape for one key, or the chord shape for one chord, a student has already learned every major key, and every major chord. By learning how to move just one note in the chord shape, the student has now learned how to play every minor chord as well. This dramatically increases the students learning speed and therefore will increase their motivation, enjoyment and capability.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings represent examples that are presented in a non-limitative manner.

DETAILED DESCRIPTION OF THE DISCLOSURE

Figure 1A:
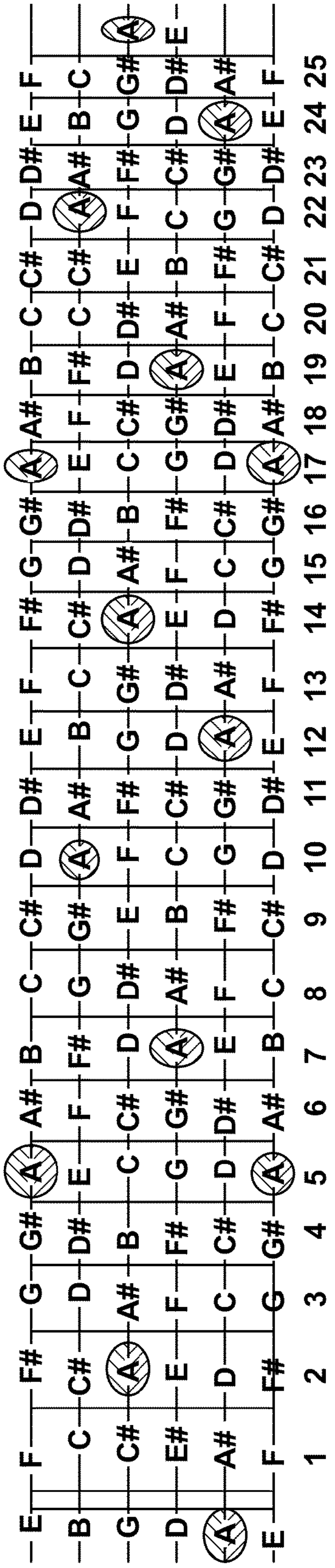
FIG. 1A (Prior Art)
FIGS. 1*a*, 1*b*, 2 and 3 are all prior art musical notification systems.
Figure 1B:
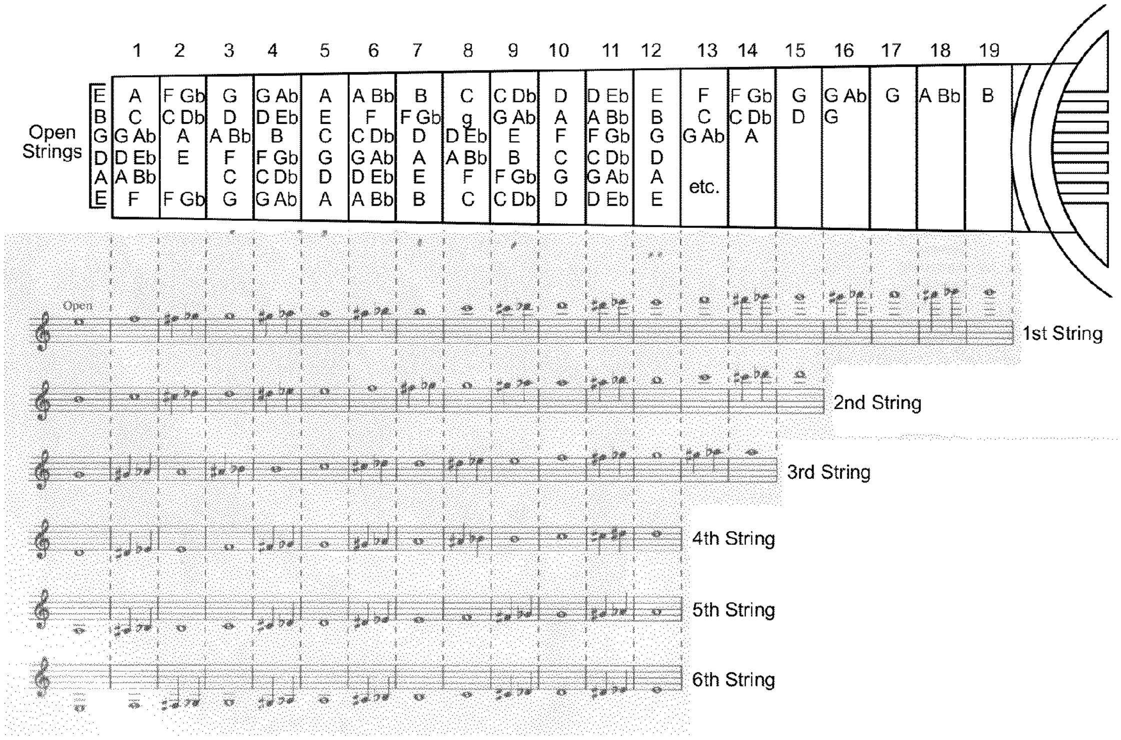
FIG. 1B (Prior Art)

The following examples are presented in a non-limitative manner.

For example, the first, second and third chord tone visual symbols can each be represented by a different color. For example, the first, second and third chord tone visual symbols can each be represented by a dot or a circle (for example of different filing or color). For example, the first, second and third chord tone visual symbols can each be represented by a same shape filled with a different filling or a different color.

In the present disclosure, the filling of the forms or shapes can be for example, dots, vertical lines, horizontal lines, diagonal lines or any lines thereof with different size or spacing, it can be also different symbols such as stars, cross, x, squares, diamond, etc. With respect to colors, various colors can be used for filling the shapes and forms presented in the present disclosure such as blue, green, red, yellow, orange, pink magenta, purple, violet, turquoise, ect.

For example, the visual display can further indicates, by means of numbers disposed on the at least a portion of a guitar fretboard, fingers of a player to be used for playing the fundamental chord tone of the given chord, the fourth overtone of the fundamental chord tone, and the second overtone of the fundamental chord tone.

For example, the first, second and third chord tone visual symbols can each further comprise an element indicating a finger of a player for playing the chord tone designated by the symbol in such a manner that the first symbol indicates a finger of the player for playing the fundamental chord tone of the given chord, the second symbol indicates a finger of the player for playing the fourth overtone of the fundamental chord tone, and the third symbol indicates a finger of the player for playing the second overtone of the fundamental chord tone For example, the first, second and third chord tone visual symbols, can each comprise a given shape filed with a different color or a different filing and wherein each of the symbols further indicates a finger of a player for playing the chord tone designated by the symbol in such a manner that the first symbol indicates a finger of the player for playing the fundamental chord tone of the given chord, the second symbol indicates a finger of the player for playing the fourth overtone of the fundamental chord tone, and the third symbol indicates a finger of the player for playing the second overtone of the fundamental chord tone.

For example, the symbols can have a circular shape and further indicate a finger of a player for playing the chord tone designated by the symbol with a given number associated for each of the indicated fingers in such a manner that the first symbol comprises a first number that indicates a finger of the player for playing the fundamental chord tone of the given chord, the second symbol comprises a second number that indicates a finger of the player for playing the fourth overtone of the fundamental chord tone, and the third symbol comprises a third number that indicates a finger of the player for playing the second overtone of the fundamental chord tone.

For example, the symbols can have a circular shape further and indicate a finger of a player for playing the chord tone designated by the symbol with a given number of lines associated for each of the indicated fingers in such a manner that the first symbol comprises a first number of lines that indicates a finger of the player for playing the fundamental chord tone of the given chord, the second symbol comprises a second number of lines that indicates a finger of the player for playing the fourth overtone of the fundamental chord tone, and the third symbol comprises a third number of lines that indicates a finger of the player for playing the second overtone of the fundamental chord tone.

For example, the visual displays can show, on the graphical representation of a full guitar fretboard, the location relationship between the given chord and its chord tones, the given chord and its chord tones being expressed in five different forms, in a given key, and in five different locations of the guitar fretboard.

For example, the fundamental, second and third scale tone visual symbols can each be represented by a different color.

For example, the fundamental, second and third scale tone visual symbols can each be represented by a diamond.

For example, the fundamental, second and third scale tone visual symbols can each be represented by a same shape filled with a different filling or color.

For example, the visual display can further indicate, by means of numbers disposed on the at least a portion of a guitar fretboard, fingers of a player to be used for playing the fundamental scale tone of the given position, the third scale tone of the given position, and the fifth scale tone of the given position.

For example, the first, second and third scale tone visual symbols can each further comprise an element indicating a finger of a player for playing the scale tone designated by the symbol in such a manner that the first symbol indicates a finger of the player for playing the fundamental scale tone of the given position, the second symbol indicates a finger of the player for playing the third scale tone of the given position, and the third symbol indicates a finger of the player for playing the fifth scale tone of the given position.

For example, the first, second and third scale tone visual symbols, can each comprise a given shape filed with a different color or a different filing and wherein each of the symbols further indicates a finger of a player for playing the scale tone designated by the symbol in such a manner that the first symbol indicates a finger of the player for playing the fundamental scale tone of the given position, the second symbol indicates a finger of the player for playing the third scale tone of the given position, and the third symbol indicates a finger of the player for playing the fifth scale tone of the given position.

For example, the symbols can have a diamond shape and further indicate a finger of a player for playing the scale tone designated by the symbol with a given number associated for each of the indicated fingers in such a manner that the first symbol comprises a first number that indicates a finger of the player for playing the fundamental scale tone of the given position, the second symbol comprises a second number that indicates a finger of the player for playing the third scale tone of the given position, and the third symbol comprises a third number that indicates a finger of the player for playing the fifth scale tone of the given position.

For example, the symbols can have a diamond shape further and indicate a finger of a player for playing the scale tone designated by the symbol with a given number of lines associated for each of the indicated fingers in such a manner that the first symbol comprises a first number of lines that indicates a finger of the player for playing the fundamental scale tone of the given chord, the second symbol comprises a second number of lines that indicates a finger of the player for playing the third scale tone of the given position, and the third symbol comprises a third number of lines that indicates a finger of the player for playing the fifth scale tone of the given position.

For example, the visual displays can show, on the graphical representation of a full guitar fretboard, the location relationship between five different positions and their scale tones, in a given key, and in five different locations of the guitar fretboard.

For example, the chord tone visual symbols can all be represented by a first shape, and the scale tones visual symbols can all be represented by a second shape adapted to receive therein the first shape, the first and forth visual symbols can both have a same first color, the second and fifth visual symbols can both have a same second color, and the third and sixth visual symbols can both have a same third color.

For example, the chord tone visual symbols can all be represented by a first shape, and the scale tones visual symbols can all be represented by a second shape adapted to receive therein the first shape, the first and forth visual symbols can both have a same first filing, the second and fifth visual symbols can both have a same second filing, and the third and sixth visual symbols can both have a same third filing.

For example, the first shape can be a circle. For example, the second shape can be a diamond.

For example, the chord tone visual symbols can all be represented by a first shape, and the scale tones visual symbols can all be represented by a second shape adapted to receive therein the first shape, the first and forth visual symbols can both have a same first color, the second and fifth visual symbols can both have a same second color, and the third and sixth visual symbols can both have a same third color.

For example, the chord tone visual symbols can all be represented by a first shape, and the scale tones visual symbols can all be represented by a second shape adapted to receive therein the first shape, the first and forth visual symbols can both have a same first filing, the second and fifth visual symbols can both have a same second filing, and the third and sixth visual symbols can both have a same third filing.

For example, the first shape can be a circle. For example, the second shape can be a diamond.

For example, the method can further comprise indicating, by means of numbers or numbers of lines disposed on the first, second and third symbols, fingers of a player to be used for playing the fundamental chord tone of the given chord, the fourth overtone of the fundamental chord tone, and the second overtone of the fundamental chord tone.

For example, wherein the method can further comprises indicating, by means of numbers or numbers of lines disposed on the fourth, fifth and sixth symbols, fingers of a player to be used for playing the fundamental scale tone of the given position, the third scale tone of the position, and the fifth scale tone of the given position.

For example, the first, second and third chord tone visual symbols can each further comprises an element indicating a finger of a player for playing the chord tone designated by the symbol in such a manner that the first symbol indicates a finger of the player for playing the fundamental chord tone of the given chord, the second symbol indicates a finger of the player for playing the fourth overtone of the fundamental chord tone, and the third symbol indicates a finger of the player for playing the second overtone of the fundamental chord tone For example, the first, second and third chord tone visual symbols, can each comprise a given shape filed with a different color or a different filing and wherein each of the symbols further indicates a finger of a player for playing the chord tone designated by the symbol in such a manner that the first symbol indicates a finger of the player for playing the fundamental chord tone of the given chord, the second symbol indicates a finger of the player for playing the fourth overtone of the fundamental chord tone, and the third symbol indicates a finger of the player for playing the second overtone of the fundamental chord tone.

For example, the first, second and third chord tone visual symbols can have a circular shape and further indicate a finger of a player for playing the chord tone designated by the symbol with a given number associated for each of the indicated fingers in such a manner that the first symbol comprises a first number that indicates a finger of the player for playing the fundamental chord tone of the given chord, the second symbol comprises a second number that indicates a finger of the player for playing the fourth overtone of the fundamental chord tone, and the third symbol comprises a third number that indicates a finger of the player for playing the second overtone of the fundamental chord tone.

For example, the first, second and third chord tone visual symbols can have a circular shape further and indicate a finger of a player for playing the chord tone designated by the symbol with a given number of lines associated for each of the indicated fingers in such a manner that the first symbol comprises a first number of lines that indicates a finger of the player for playing the fundamental chord tone of the given chord, the second symbol comprises a second number of lines that indicates a finger of the player for playing the fourth overtone of the fundamental chord tone, and the third symbol comprises a third number of lines that indicates a finger of the player for playing the second overtone of the fundamental chord tone.

For example, the fourth, fifth and sixth scale tone visual symbols can each further comprise an element indicating a finger of a player for playing the scale tone designated by the symbol in such a manner that the fourth symbol indicates a finger of the player for playing the fundamental scale tone of the given position, the fifth symbol indicates a finger of the player for playing the third scale tone of the given position, and the sixth symbol indicates a finger of the player for playing the fifth scale tone of the given position.

For example, the fourth, fifth and sixth scale tone visual symbols, each can comprises a given shape filed with a different color or a different filing and wherein each of the symbols further indicates a finger of a player for playing the scale tone designated by the symbol in such a manner that the fourth symbol indicates a finger of the player for playing the fundamental scale tone of the given position, the fifth symbol indicates a finger of the player for playing the third scale tone of the given position, and the sixth symbol indicates a finger of the player for playing the fifth scale tone of the given position.

For example, the fourth, fifth and sixth visual scale tone symbols have a diamond shape and further indicate a finger of a player for playing the scale tone designated by the symbol with a given number associated for each of the indicated fingers in such a manner that the first symbol comprises a first number that indicates a finger of the player for playing the fundamental scale tone of the given position, the second symbol comprises a second number that indicates a finger of the player for playing the third scale tone of the given position, and the third symbol comprises a third number that indicates a finger of the player for playing the fifth scale tone of the given position.

For example, the fourth, fifth and sixth visual symbols have a diamond shape further and indicate a finger of a player for playing the scale tone designated by the symbol with a given number of lines associated for each of the indicated fingers in such a manner that the first symbol comprises a first number of lines that indicates a finger of the player for playing the fundamental scale tone of the given chord, the second symbol comprises a second number of lines that indicates a finger of the player for playing the third scale tone of the given position, and the third symbol comprises a third number of lines that indicates a finger of the player for playing the fifth scale tone of the given position.

For example, the method further comprises indicating, by means of numbers or numbers of lines disposed on the first, second and third symbols, fingers of a player to be used for playing the fundamental chord tone of the given chord, the fourth overtone of the fundamental chord tone, and the second overtone of the fundamental chord tone.

For example, the method can further comprise indicating, by means of numbers or numbers of lines disposed on the fourth, fifth and sixth symbols, fingers of a player to be used for playing the fundamental scale tone of the given position, the third scale tone of the position, and the fifth scale tone of the given position.

For example, the first, second and third chord tone visual symbols can each further comprise an element indicating a finger of a player for playing the chord tone designated by the symbol in such a manner that the first symbol indicates a finger of the player for playing the fundamental chord tone of the given chord, the second symbol indicates a finger of the player for playing the fourth overtone of the fundamental chord tone, and the third symbol indicates a finger of the player for playing the second overtone of the fundamental chord tone For example, the first, second and third chord tone visual symbols can further indicate a finger of a player for playing the chord tone designated by the symbol with a given number associated for each of the indicated fingers in such a manner that the first symbol comprises a first number that indicates a finger of the player for playing the fundamental chord tone of the given chord, the second symbol comprises a second number that indicates a finger of the player for playing the fourth overtone of the fundamental chord tone, and the third symbol comprises a third number that indicates a finger of the player for playing the second overtone of the fundamental chord tone.

For example, the fourth, fifth and sixth scale tone visual symbols can each further comprise an element indicating a finger of a player for playing the scale tone designated by the symbol in such a manner that the fourth symbol indicates a finger of the player for playing the fundamental scale tone of the given position, the fifth symbol indicates a finger of the player for playing the third scale tone of the given position, and the sixth symbol indicates a finger of the player for playing the fifth scale tone of the given position.

For example, the fourth, fifth and sixth scale tone visual symbols can further indicate a finger of a player for playing the scale tone designated by the symbol with a given number associated for each of the indicated fingers in such a manner that the first symbol comprises a first number that indicates a finger of the player for playing the fundamental scale tone of the given position, the second symbol comprises a second number that indicates a finger of the player for playing the third scale tone of the given position, and the third symbol comprises a third number that indicates a finger of the player for playing the fifth scale tone of the given position.

For example, the visual display can be effective for classifying each of the chords as a function of three variables that are the tonic harmonic character, the predominant harmonic character and the dominant harmonic character of each of the chords.

For example, the tonic harmonic function can be designated as rest function, the predominant harmonic function is designated as motion function, and the dominant harmonic function is designated as tension function.

For example, the circles are each filled with a different color.

For example, the circles can each be filled with a different color, each of the colors being gradually varying in intensity, in its respective circle, in an increasing manner according to an axis extending from the central overlapping zone of the Venn diagram towards the outside of each of the circle, thereby expressing variation in intensity of the harmonic function related to each of said circles.

For example, in the visual display, the circles can be filled with a different color, each of the circles defining and axis extending from the center of the Venn diagram towards the outside of the circle, an angle of 120 degrees is defined by two adjacent axis, the colors being gradually varying in intensity, in their respective circle, in an increasing manner according to an axis extending from the central overlapping zone of the Venn diagram towards the outside of each of the circle.

For example, the Venn Diagram can comprise three circles defining three non-overlapping zones, three eccentric overlapping zones and one central overlapping zones, and wherein the symbols designating the chords are disposed the three non-overlapping zones and the three eccentric overlapping zones.

For example, the Venn Diagram can consist in three circles defining three non-overlapping zones, three eccentric overlapping zones and one central overlapping zones, and wherein the symbols designating the chords are disposed the three non-overlapping zones and the three eccentric overlapping zones.

For example, the visual display can comprises 18 chords and wherein the symbols designating the chords are Roman numerals and each of the chord.

For example, the visual display can comprise:

the first circle non-overlapping zone comprises the symbols I and (i);

the second circle non-overlapping zone comprises the symbols IV and ii;

the third circle non-overlapping zone comprise the symbols V, vii$^{ø}$ and optionally (vii$^{ø}$);

the overlapping zone between the first and second circles comprises the symbols vi and (bIII);

the overlapping zone between the first and third circles comprises the symbols vii and (v);

the overlapping zone between the second and third circles comprises the symbols (bVI), ((iv), (bVII), [V of vi], [V of V], [V of IV], [V of ii] and [V of iii].

For example, each of the chords can be represented in the diagramm by means of a different color.

For example, the visual displays of the present disclosure can be in the form of a book, a printing, tables, sheets, posters, softwares, applications for a cellphone or an intelligent cellphone (such as iPhone™, Blackberry™ etc.)

Chord Tone

Figure 4:
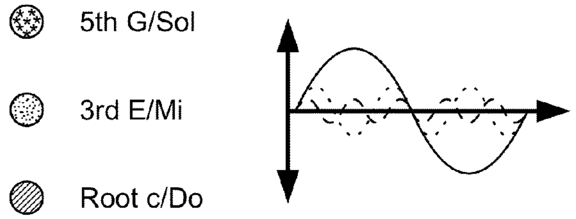
FIG. 4 (black and white) is schematic representation of the mathematical relationship between a fundamental note (root), the fourth overtone of the fundamental note ($3^{rd}$), and the second overtone of the fundamental note ($5^{th}$)
Figure 18:
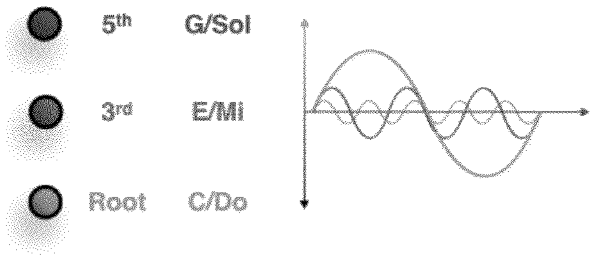
FIG. 18 is the equivalent, in colors, of FIG. 4.

FIGS. 4 and 18 shows the mathematical relationship of any fundamental frequency to its overtone series. Only three are expressed; the fundamental chord tone (or the root), the fourth overtone of the fundamental chord tone (or the 3$^{rd}$), and the second overtone of the fundamental chord tone (or the 5$^{th}$). These three chord tones are the core building blocks that create triads, referred to as chords. For example, the root, 3$^{rd}$ and 5$^{th}$ can be represented by various symbols as previously discussed. In FIGS. 4 and 18, there are represented by circles. Such circles can be of different filling (for example lines for the root, dots or points for the 3$^{rd}$ and stars for the 5$^{th}$) or different colors (for example green for the root, red for the 3$^{rd}$ and blue for the 5$^{th}$).

Scale Tone

Figure 5:
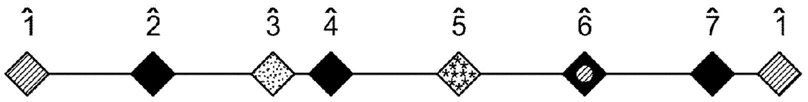
FIG. 5 is a visual representation of a scale with its scale tones.
Figure 19:
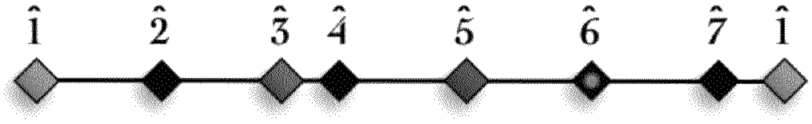
FIG. 19 is the equivalent, in colors, of FIG. 5.

A scale is an arrangement of seven mathematically related notes, instead of just three (see FIGS. 5 and 19). The fundamental note, the fourth overtone of the fundamental note, and the second overtone of the fundamental note (root, 3$^{rd}$ and 5$^{th}$) belong here as well, along with four others. A scale tone is any note that belongs to the scale, its name designating its numerical position, for example "scale tone 1". In the visual displays and methods of the present disclosure, scale tones are differentiated from chord tones by their shape (see FIGS. 4 and 18 in which chord tones are represented by dots or circles and FIGS. 5 and 19 in which scale tones are represented by diamonds). For example, the scale tone symbols can be represented by various types of shapes and can be filled with various types of fillings or colors. Such shapes can be of different filling (for example lines for the root, dots or points for the 3$^{rd}$ and stars for the 5$^{th}$) or different colors (for example green for the root, red for the 3$^{rd}$ and blue for the 5$^{th}$).

Figure 6:
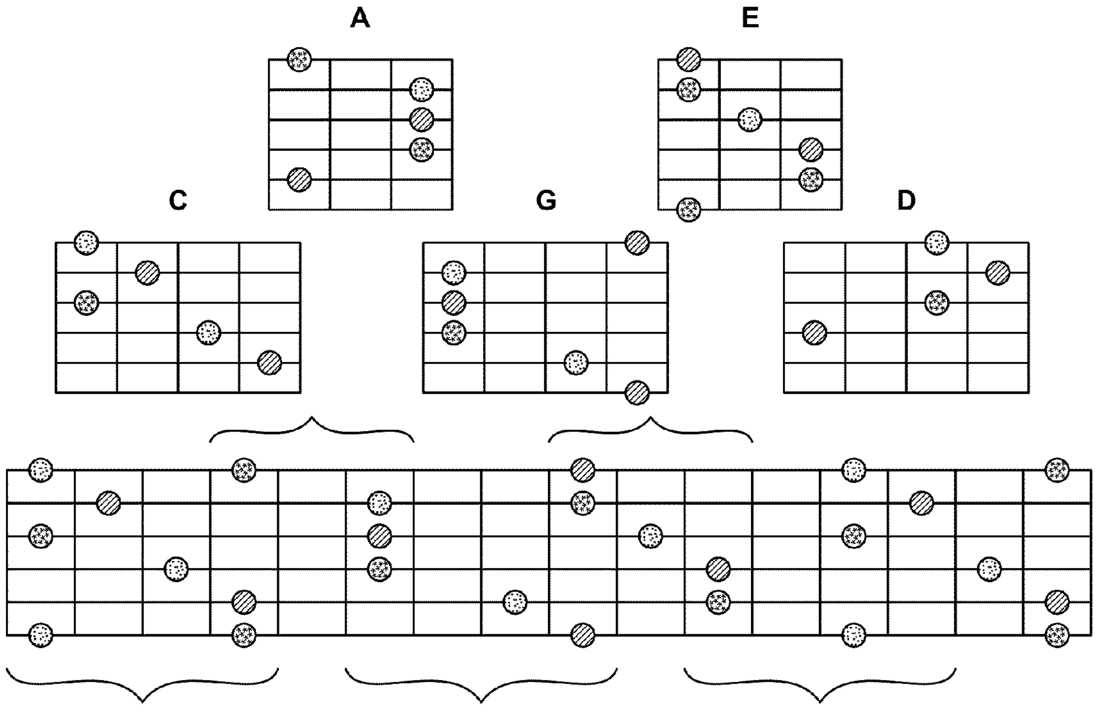
FIG. 6 is a visual display according to an example of the present disclosure.
Figure 20:
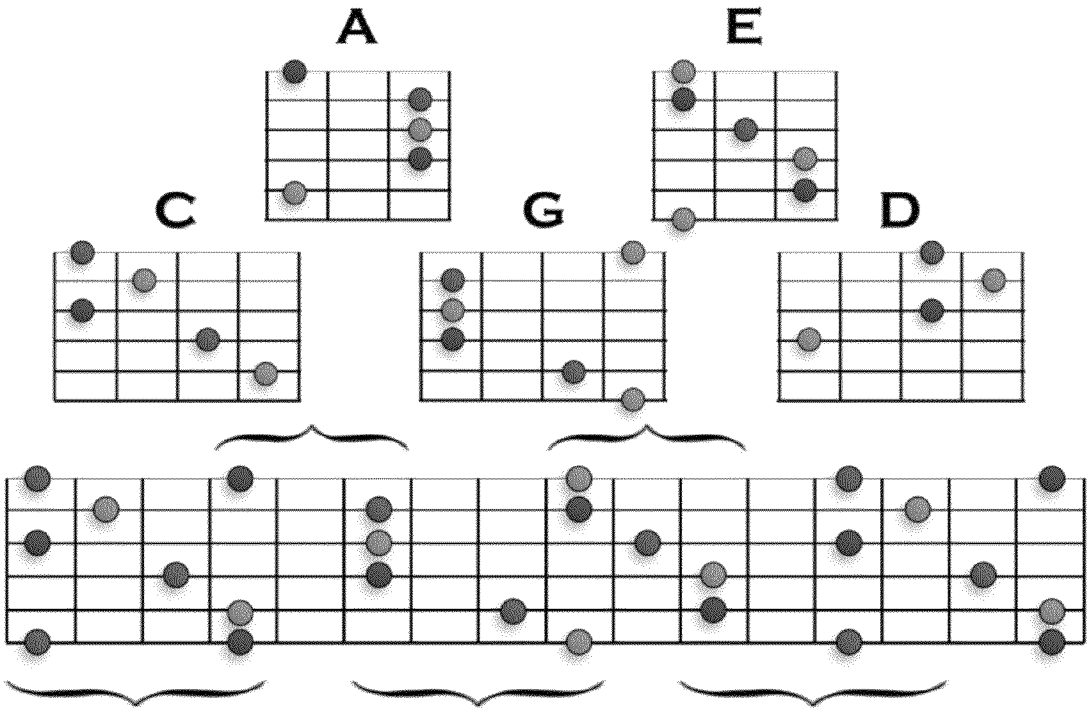
FIG. 20 is the equivalent, in colors, of FIG. 6.

Chord tones are arranged into five different forms on the guitar, referred to as C, A, G, E and D Form (see FIGS. 6 and 20). For example, the chords are shown, in the visual symbols of FIGS. 6 and 20, by means of chord tone visual symbols (such as circles that are, for example, filled different filling (for example lines for the root, dots or points for the 3$^{rd}$ and stars for the 5$^{th}$) or different colors (for example green for the root, red for the 3$^{rd}$ and blue for the 5$^{th}$)). This allows for showing on a visual representation of a guitar fretboard a location relationship between a given chord and its chord tones.

Figure 7:
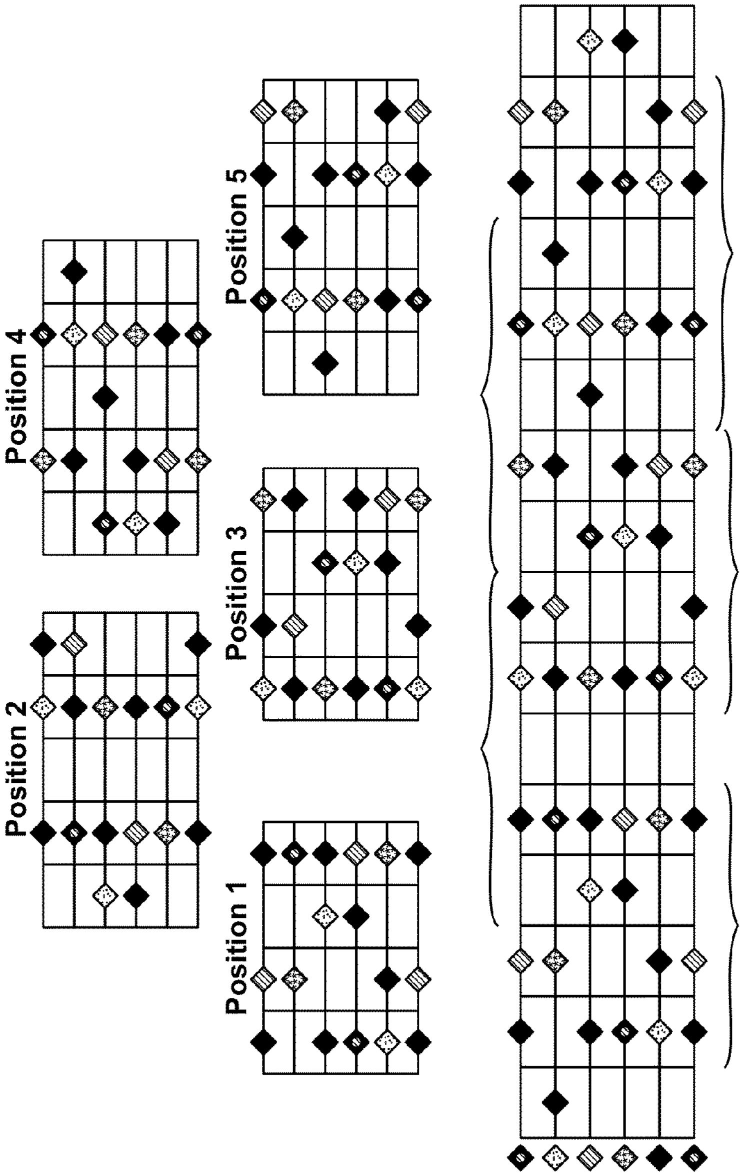
FIG. 7 is another visual display according to an example of the present disclosure.
Figure 21:
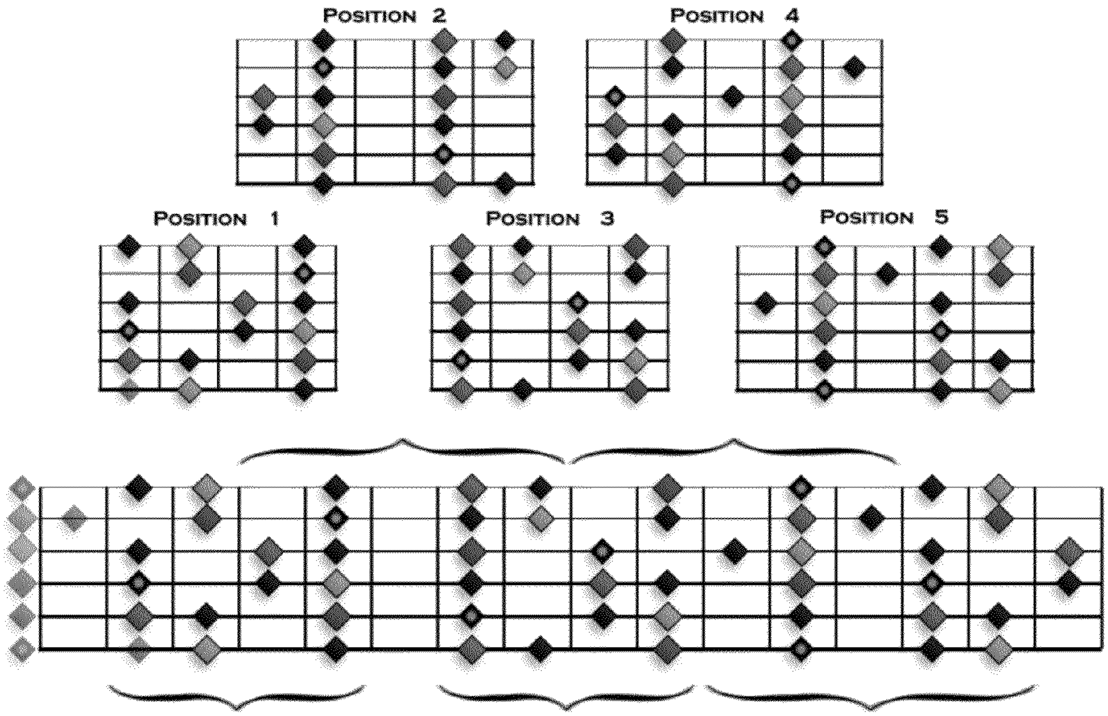
FIG. 21 is the equivalent, in colors, of FIG. 7.

Scale tones are arranged into five different positions on the guitar fretboard, called positions 1 to 5 (see FIGS. 7 and 21). For example, the scales are shown, in the visual symbols of FIGS. 7 and 21, by means of scale tone visual symbols (such as diamonds that are, for example, filled different filling (for example lines for the root, dots or points for the 3$^{rd}$ and stars for the 5$^{th}$) or different colors (for example green for the root, red for the 3$^{rd}$ and blue for the 5$^{th}$)). This allows for showing on a visual representation of a guitar fretboard a location relationship between a given chord and its scale tones.

Figure 8:
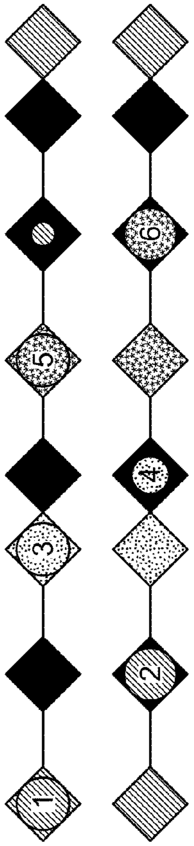
FIG. 8 is another visual display according to an example of the present disclosure.
Figure 9:
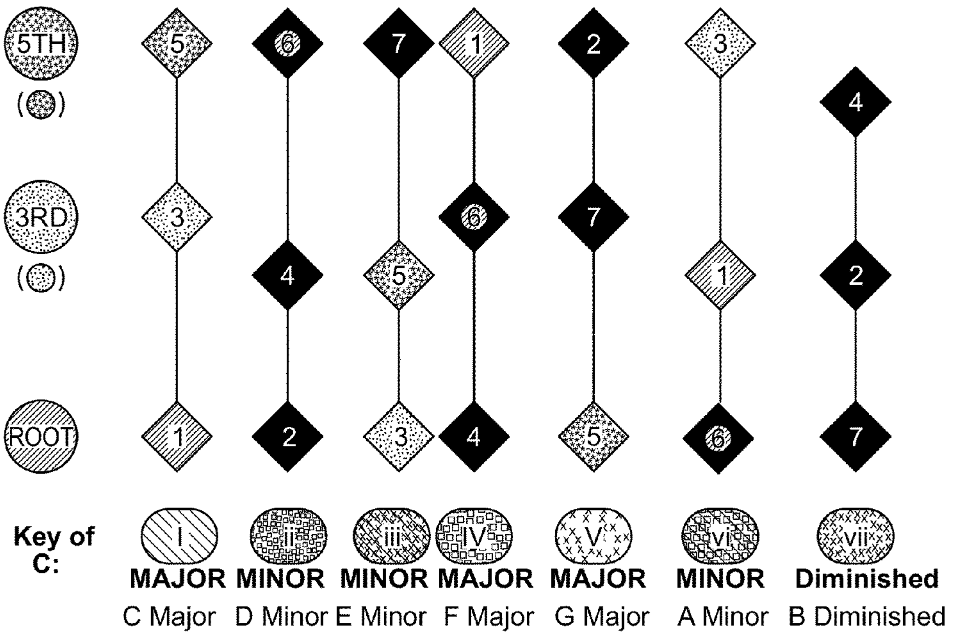
FIG. 9 is another visual display according to an example of the present disclosure.
Figure 22:
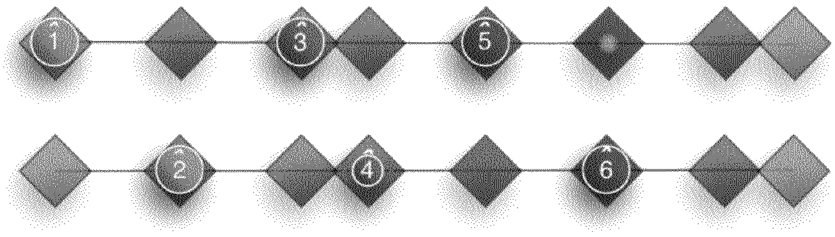
FIG. 22 is the equivalent, in colors, of FIG. 8.
Figure 23:
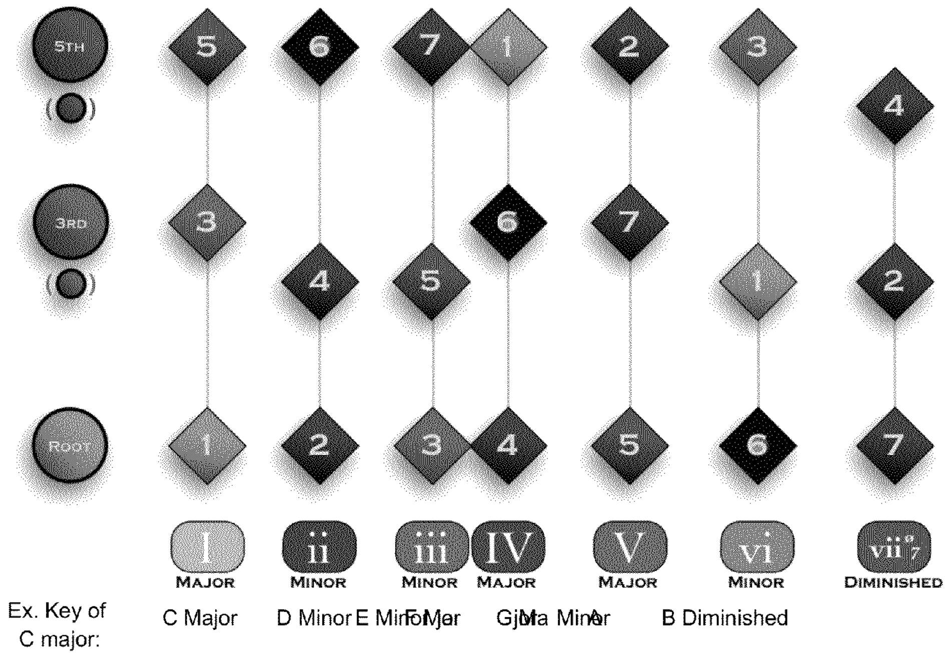
FIG. 23 is the equivalent, in colors, of FIG. 9.

One of the aims of the notation systems of the present disclosure is to convey a specific notes relationship to both the chord and the scale. For example, a chord is a grouping of only three notes (chord tones) within the scale, the name of the chord taken from whichever scale tone the root of the chord happens to be. If the root of the chord were to be scale tone 1, the chord would be called chord I, if the root were to be on scale tone 2, it would be called chord ii (see FIGS. 8 and 22 that show chord I (top) and chord ii (bottom)) This means that each scale tone might be designated by any chord tone, depending on what chord is selected. (see FIGS. 9 and 23).

Figure 10:
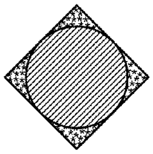
FIG. 10 is another visual display according to an example of the present disclosure.
Figure 24:
FIG. 24 is the equivalent, in colors, of FIG. 10.

One of the aims of this notation system is to allow the player to see relationships visually, rather than intellectually, creating a much more efficient level of understanding. For example, by allowing the circle shape of the chord tone to expose the corners of the diamond shaped scale tones, both colors (or fillings) can be seen immediately and therefore the information from both charts can be conveyed. For example, FIGS. 10 and 24 show scale tone 5 functioning as the root of a chord.

Figure 11:
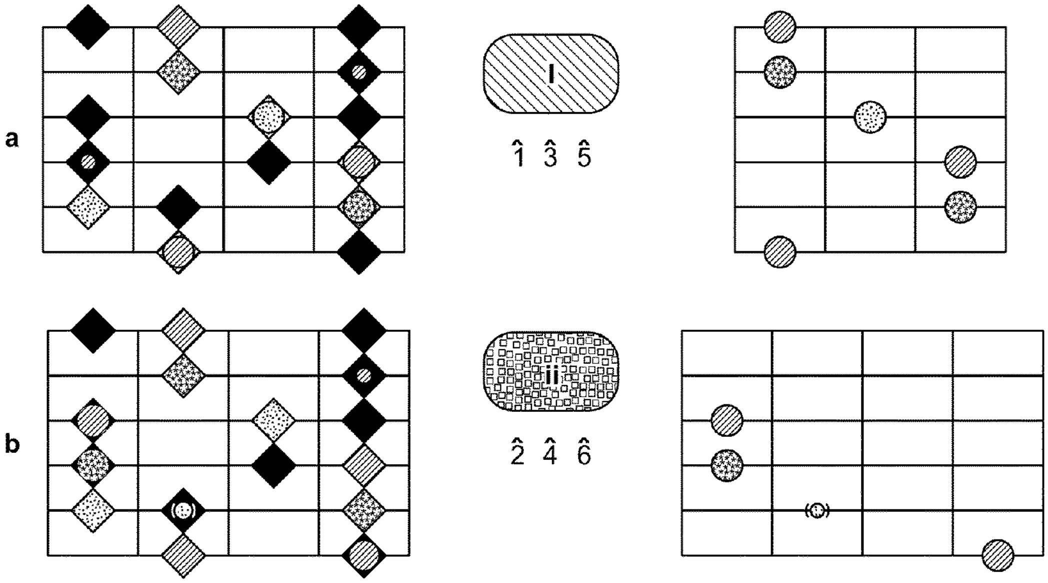
FIGS. 11*a* and 11*b* are examples of a visual representation of the superposition of elements in a music notation method according to the present disclosure.
Figure 25:
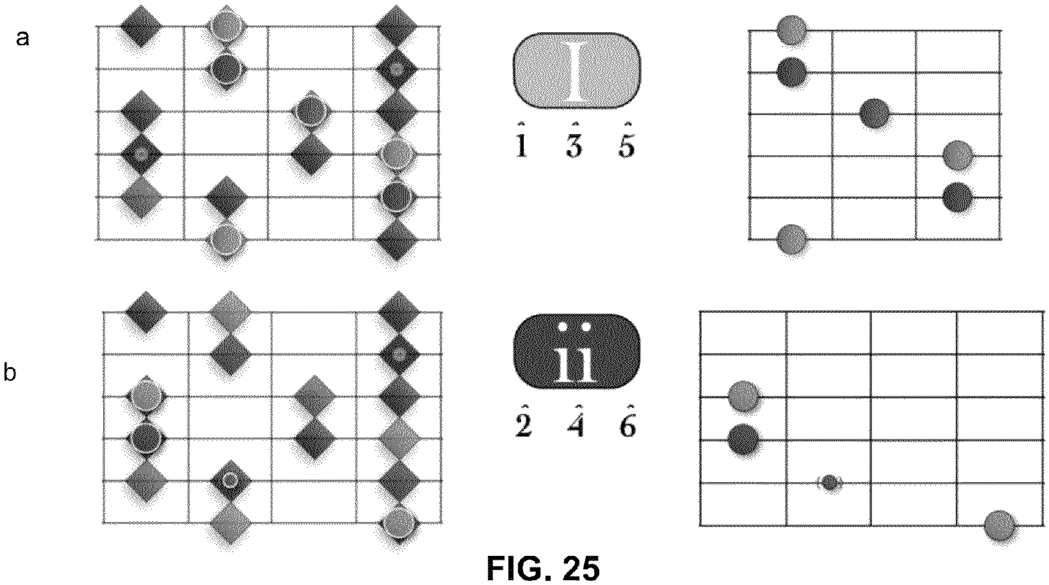
FIG. 25*a* is the equivalent, in colors, of FIG. 11*a;*
FIG. 25*b* is the equivalent, in colors, of FIG. 11*b;*

On a large scale, this works to eliminate any letter naming (A B C, Do Re Mi), and by doing so eliminates the need for the player to memorize the letter names on the fretboard, and the need to learn how to read the classic notation system. In each scale position, the shapes interact perfectly with each scale tone, allowing the player to visually see relationships in depth, as shown in FIGS. 11(*a*) and 11(*b*) and FIGS. 25(*a*) and 25(*b*)). FIG. 11(*a*) the superposition of form E (see FIG. 6) into position 1 (scale position 1) is made in order to obtain scale tone "I" and FIG. 11(*b*) corresponds to the superimposition of form E into scale position 1 (see also FIGS. 20, 25(*a*) and 25(*b*) to see the equivalent in color. This allows the musician to visually understand any chords relationship to the scale it belongs to and vice versa at a very high level immediately. When used on a large scale, a student can play any song, chord, or melody in any key, in any location on the fretboard with proficiency. It also gives an improvising musician a very valuable mode of perception that allows him to process a usually overwhelming amount of information quickly and precisely.

For example, each chord number can be associated with a unique syntactic color (or filling) based on its syntax or "harmonic Function" which describes the sensation each chord gives the listener. Harmonic function in classical terms are "tonic", "predominant, and "dominant". For rxample they can be described as "rest", "motion", and "tension", respectively. These colors are used in the notation system behind every chord number to express the chords syntactic function as well (see FIG. 12A and FIG. 26).

Figure 12A:
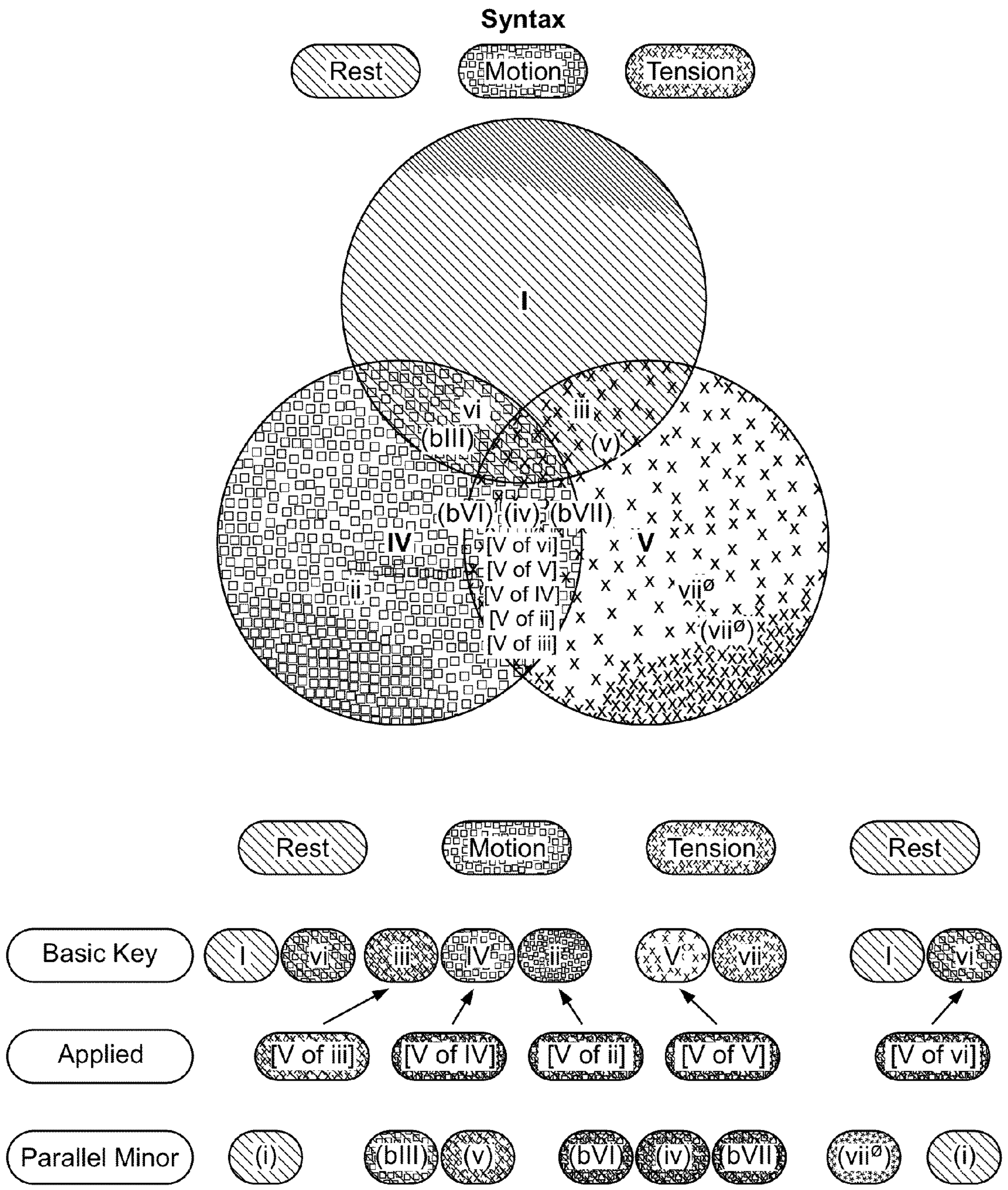
FIG. 12A is visual display for expressing musical harmonic functions according to an example of the present disclosure.
Figure 26:
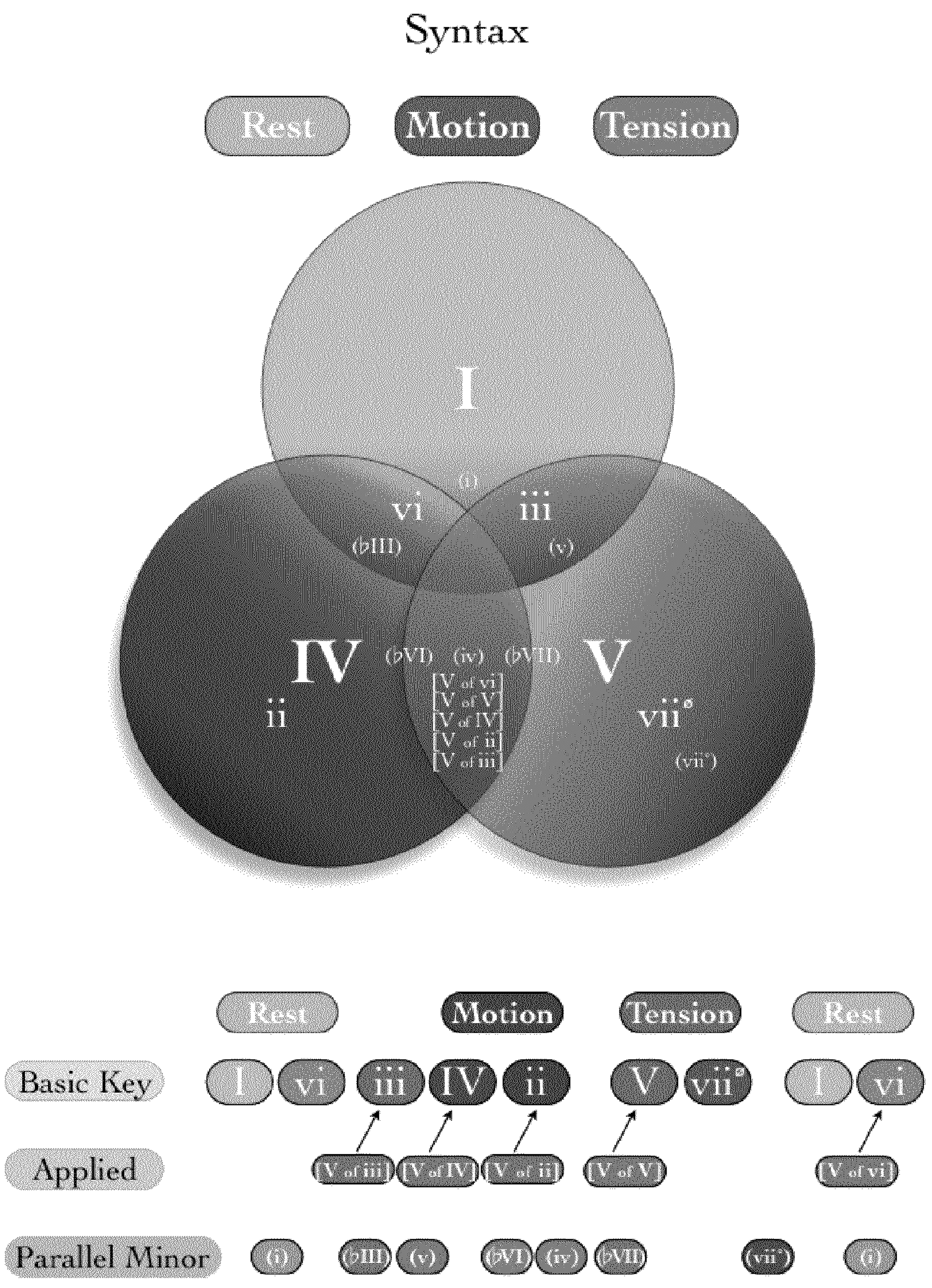
FIG. 26 is the equivalent, in colors, of FIG. 12A.

For example, in. FIGS. 12A and 26, the chords are represented or classified in the Venn diagram as a function of their harmonic function. For example, they are disposed in the three circles as a function of three variables that are the tonic harmonic character (or component)_, the predominant harmonic character (or component) and the dominant harmonic character (or component) of each of the chords. Some chords are thus disposed within non-overlapping zones (for example see I, IV, etc.) and some are disposed in overlapping zones (see for example mvi or [V of V]). No chord are disposed in the central overlapping zone (also called universal zone of a Venn diagram). As it can be seen the intensity (or density) of the color or the filling of the circles varies. In fact, it gradually varies by gradually increasing the density or intensity, starting from the central point (or center or central overlapping zone) of the Venn diagram towards the outside of each of the circles. Such graduation (increase in the color intensity or density of the filling) corresponds to an increase of the given character corresponding to a given circle and is expressed in FIG. 12B. In fact, such an increase in intensity or density reflects the increase of each variable i.e. the tonic harmonic character (or component) ("rest"), the predominant harmonic character (or component) ("motion") and the dominant harmonic character (or component) ("tension") of each of the chords. For each circle (also called set in a Venn Diagram), the intensity or density is increasing along an axis extending from the central overlapping zone of the Venn diagram towards the outside of each of the circle (see FIG. 12B). These three axis are all defined by extending from the center of the Venn diagram towards the outside of is circles, and an angle of 120 degrees is defined by two adjacent axis. As a result, each chord as a unique color or a unique representation in terms of the components of its filling (symbols and density).

Figure 12B:
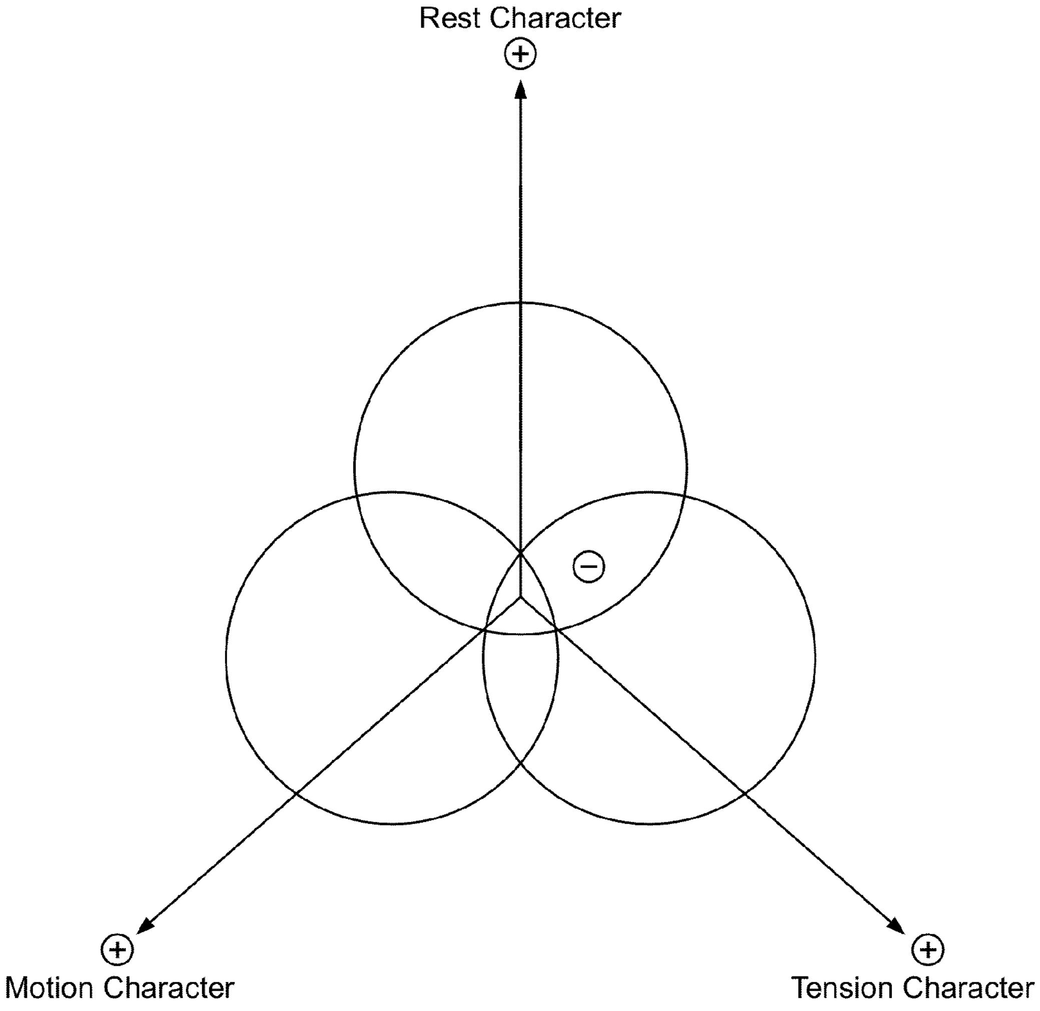
FIG. 12B illustrates variation of harmonic functions character in the visual display of FIG. 12A.

As it can be seen in FIGS. 12A, 26 and 12B, the portion of each circle that is the most far from the central point of the Venn diagram, it the portion the more intense in terms of color or in terms of density of symbols, thereby indicating stronger or more important expression of the given character of a given circle (rest, motion or tension).

It can thus be said that the chord are expressed, for example, by the gradual mixture of the surrounding colors when close to overlapping zones.

The intersections (or overlapping zones) of these sets (circles) indicates a harmonic mixture of harmonic function, for example, Tonic and Predominant, or Tonic and Dominant, or Predominant and Dominant It is accepted in the musical tradition that chords can be represent by Roman Numerals, upper case numerals indicating Major chords, and lower case roman numerals indicating minor chords. Other symbols are used to indicate diminished chords, 7th chords etc. Placed on this diagram are the Roman Numeral representations of musical chords, for example, I ii iii IV . . . in the appropriate set that indicates their harmonic function, or in the intersection of their harmonic functions. In the diagram there are a selection of 18 chords, both diatonic (within the key) and chromatic (not within the key, requiring modifiers like 'flat' or 'sharp' b, #). 18 is not an upper or lower the limit, more may be used, these 18 are however the most frequently chords used in music. For example, the placement of each chord within the set is can be importance, because every location inside the set or inside the intersection of a set is not consistent, but a gradual spectrum or mixture of the surrounding sets. This means that each chord gets a unique color value (or filling value) and therefore a unique harmonic function.

For beginners, a more basic chart can be given that provides all this information on every chord, but does not show each chords relationship to the larger picture, or CAGED (chord C+A+G+E+D). The chords are arranged according to the syntactical functions in FIG. 12A. The beginners chart can be seen in FIG. 13.

Figure 13:
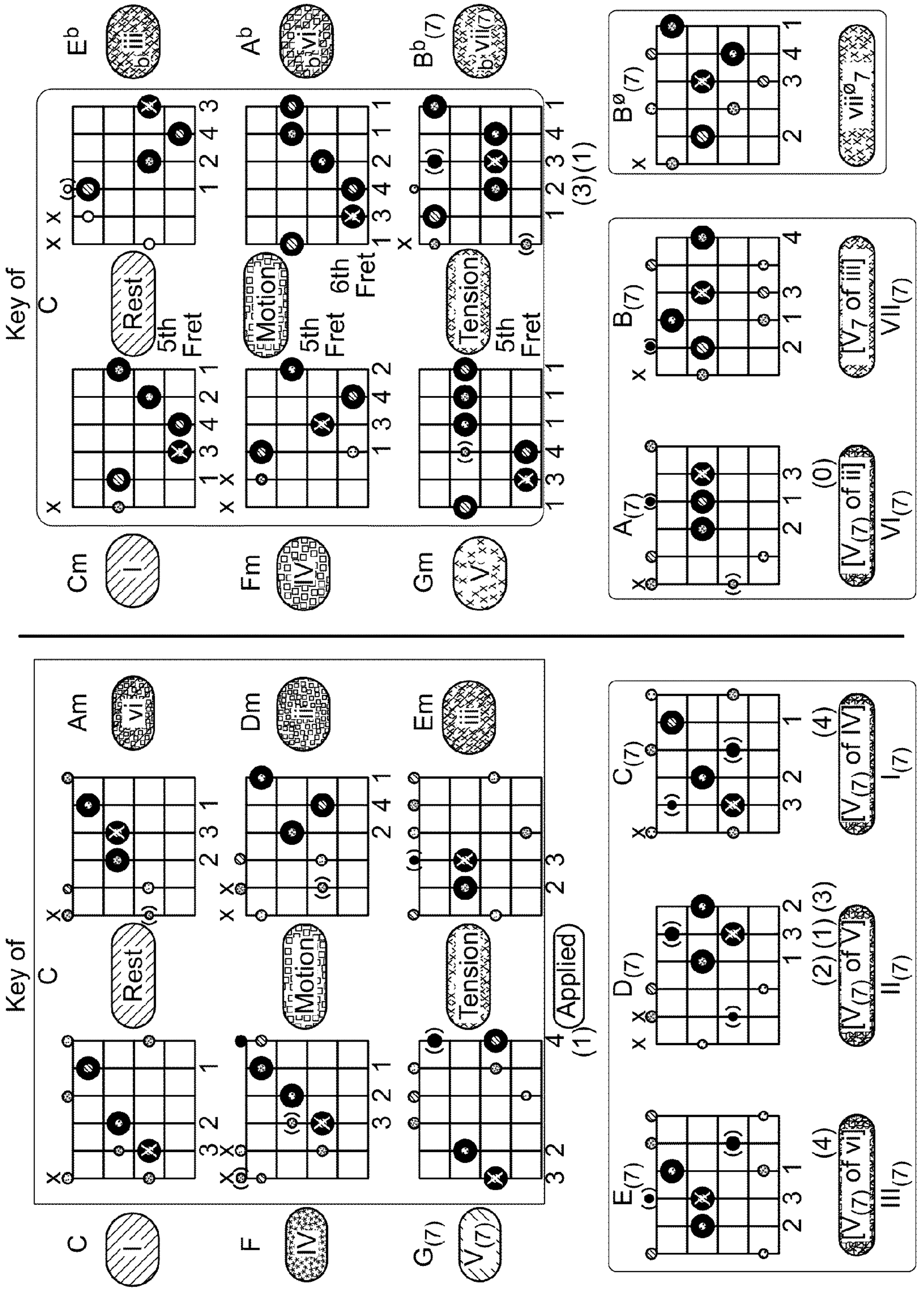
FIG. 13 is an example of a visual representation of a music notation method according to the present disclosure.
Figure 27:
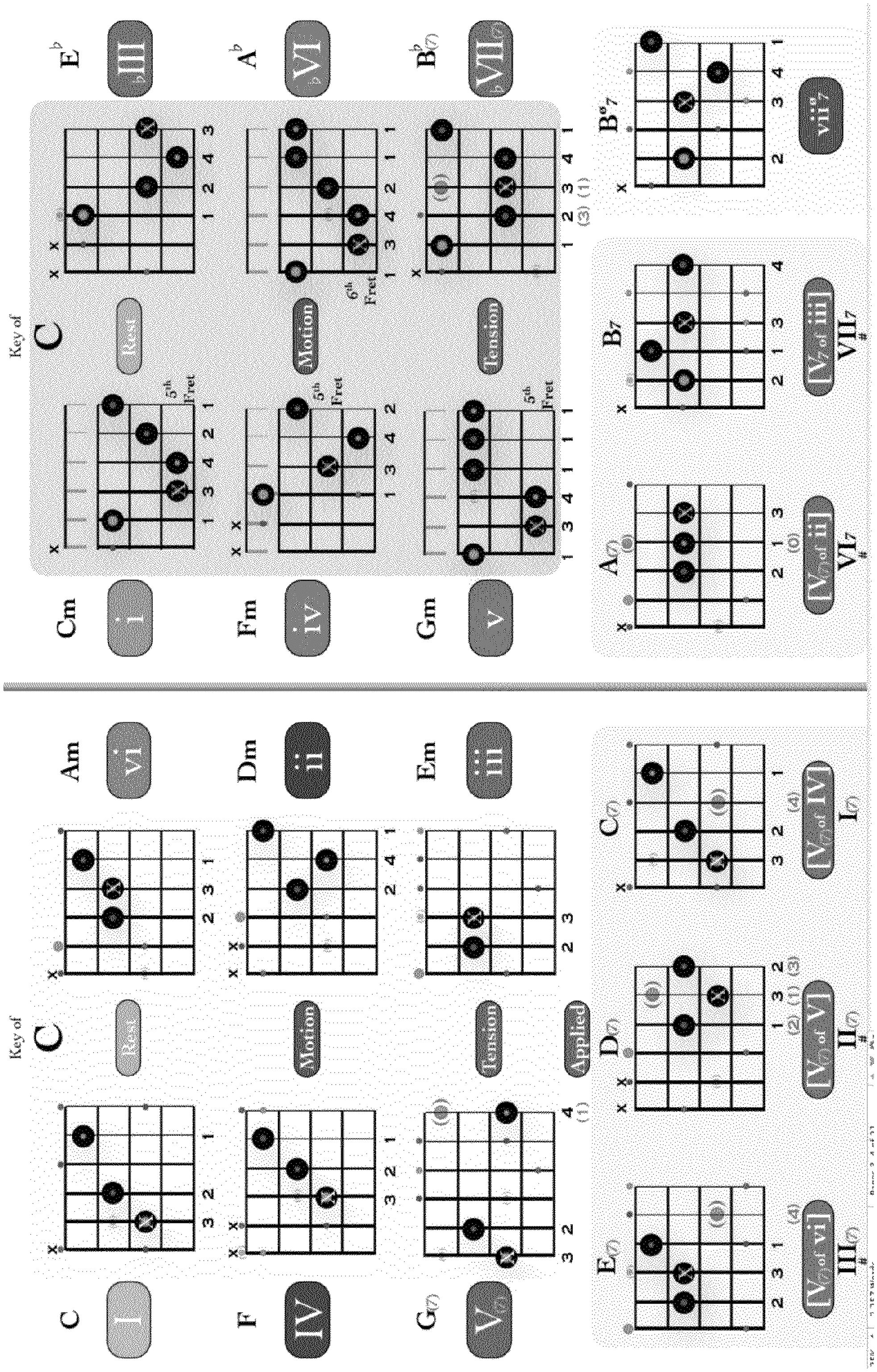
FIG. 27 is the equivalent, in colors, of FIG. 13.

In FIGS. 13 and 27, the various chords are expressed with chord tone visual symbols that are slightly different than those used in FIGS. 4 and 5 (see also FIGS. 18 and 19). It refers to a different embodiment. However, the principle is the same, the chord are designated in terms of their root, $3^{rd}$ and $5^{th}$. Other positions corresponding to positions related to the root, $3^{rd}$ and $5^{th}$ of a given chord are also shown in the guitar fretboards of FIGS. 13 and 27. They refer to chord tones that fit or that can be played with the given chord illustrated. These other positions (those not surrounded by thicker black circles) thus represent alternative manners of playing the chord by showing other possibilities for playing the various chord tones.

In FIGS. 13 and 27, Arabic numbers are shown below the guitar fretboards so as to indicate the most appropriate finger to be used for playing the corresponding chord tone shown just above.

Whether on a musical partition or on a guitar chord or scale chart, just as important as what notes to play, are what fingers to play the indicated notes with. The hand that 'frets' the notes on the guitar (typically the left hand for right handed guitar players) uses four fingers, the index which is referred to as finger 1, the middle finger 2, the annular 3, and the pinky 4.

Typically fingering is notated by using the Arabic numbers 1 2 3 and 4, indicating fingers 1,2,3 and 4 respectively.

Figure 14:
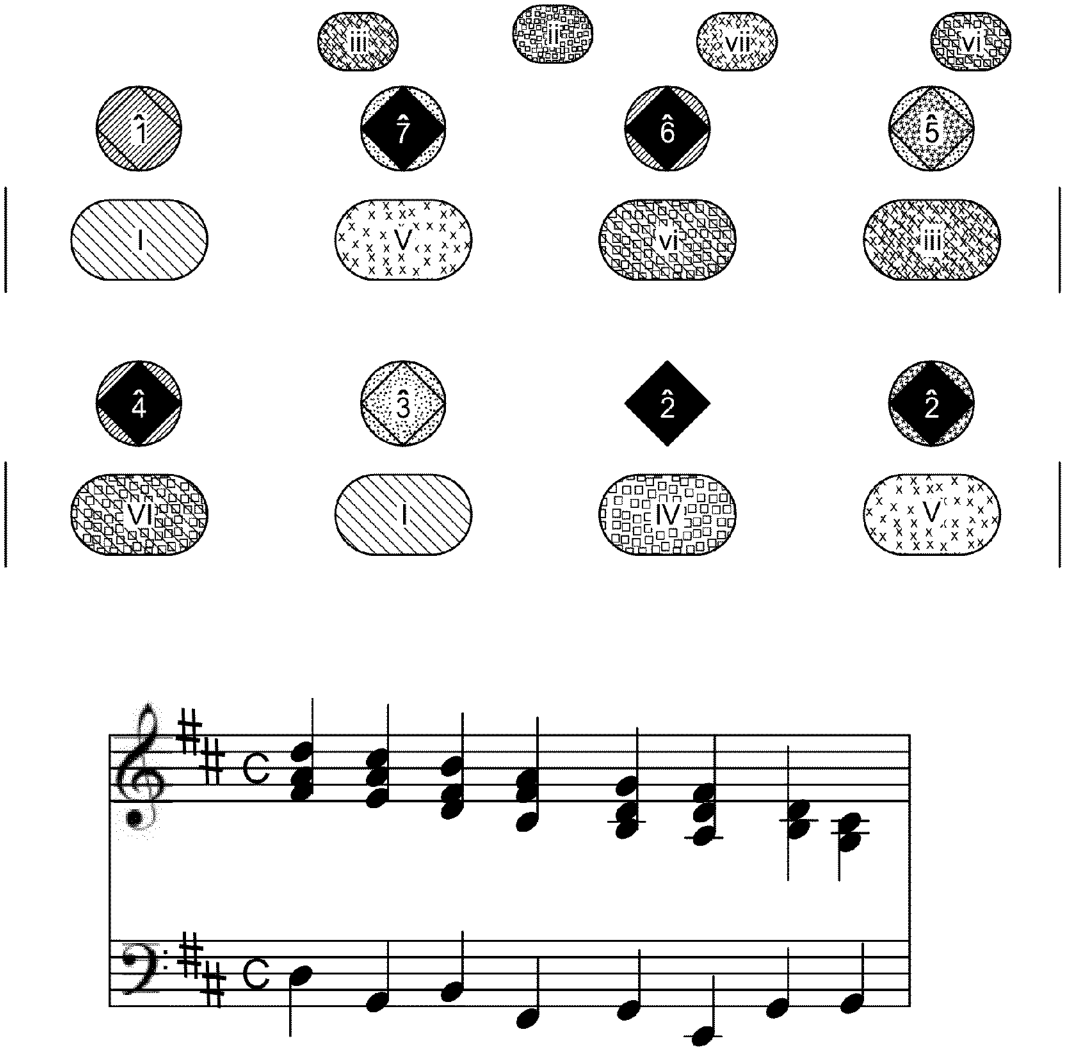
FIG. 14 is an example of a visual representation of a music notation method according to the present disclosure.
Figure 28:
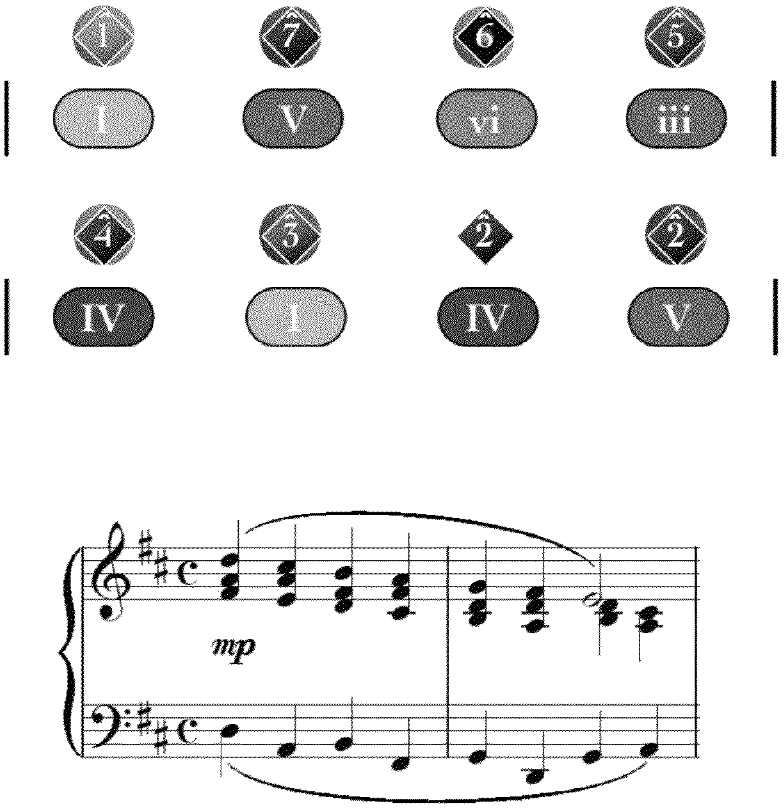
FIG. 28 is the equivalent, in colors, of FIG. 14.

FIGS. 14 and 28 are examples of the full notation system in use to play a Pachelbel's Canon in D. Classic notation of the same example is shown. Scale degree above the chord are the melody notes, or highest note heard.

Figure 15:
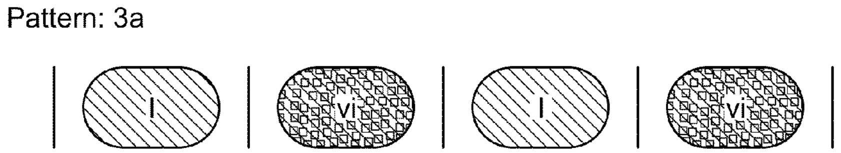
FIG. 15 is an example of a visual representation of a music notation method according to the present disclosure.
Figure 17A:
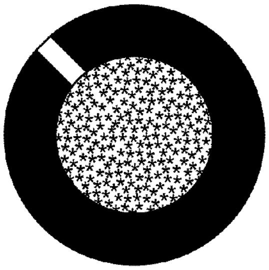
FIGS. 17A, 17B, 17C and 17D are examples of visual representation of symbols designating a chord tone.
Figure 29:
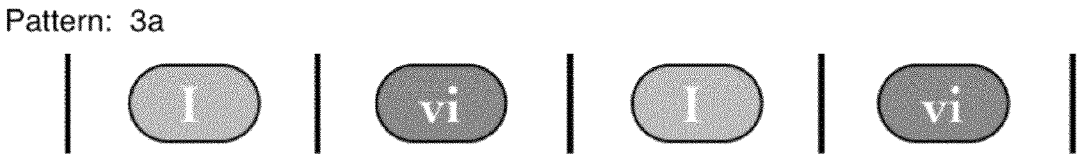
FIG. 29 is the equivalent, in colors, of FIG. 15.
Figure 31A:
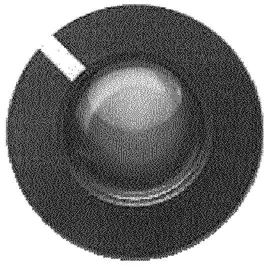
FIGS. 31A, 31B, 31C and 31D are the equivalent, in colors, of FIGS. 17A, 17B, 17C and 17D.

FIGS. 15 and 29 are representations of the first four bars of the song "Hallelujah". By providing the chord numbers and a right hand picking pattern (indicated here as pattern 3$a$), the song can be played. This is a substantial reduction in the amount of information needed to play the song when compared with tablature or standard notation wherein a student must read every note played.

Figure 17B:
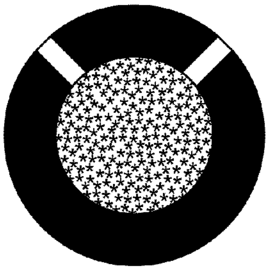
Figure 16C:
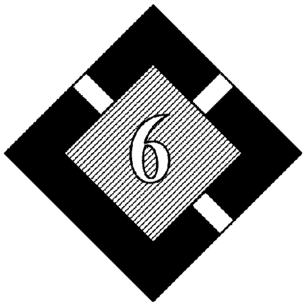
Figure 17C:
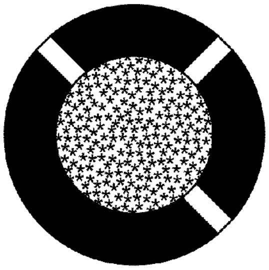
Figure 16D:
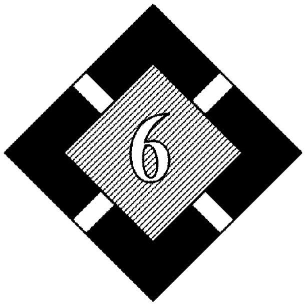
Figure 17D:
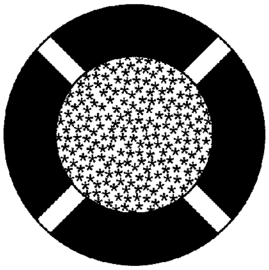
Figure 31B:
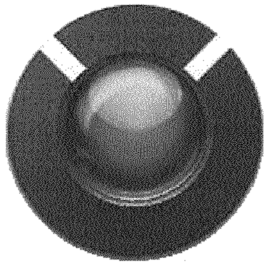
Figure 30C:
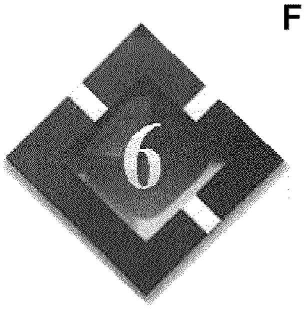
Figure 31C:
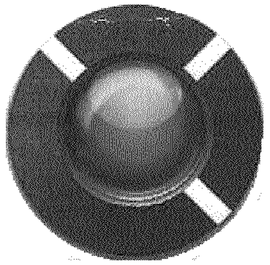
Figure 30D:
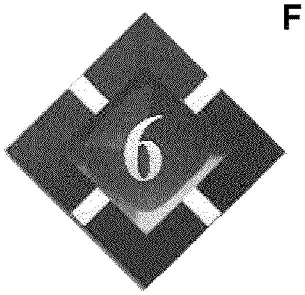
Figure 31D:
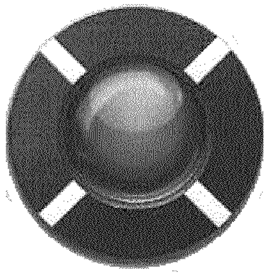

FIGS. 17A, 17B, 17C, 17D, 31A, 31B, 31C and 31D show different embodiments concerning the chord tone visual symbols used in FIGS. 4, 6, 13, 18, 20 and 27. In fact, on the chord tone visual symbols of FIGS. 17A-17D and 31A-31D, further indicate the best or most appropriate finger of the player to be used for playing the chord. In the present case, the finger is indicated not by an Arabic number (as in FIGS. 13 and 27) but rather by means of a number of lines. Thus, FIGS. 17A and 31A (one line) designate finger 1 (index); FIGS. 17B and 31B (two lines) designate finger 2 (the middle finger), FIGS. 17C and 31C (three lines) designate finger 3 (the annular), and FIGS. 17D and 31D (four lines) designate finger 4 (the pinky).

Thus the player can see both the note to be played and the finger used to play it. This can have a drastic effect on the overall aesthetic cleanliness of a musical partition. In some partitions the numbering itself may be mistaken for a note itself.

On guitar chord charts it not only saves the eye from having to travel from the location of the note on the chart, following its specific string to the very bottom of the chart to see the finger number, but also allows for every possible chord tone that exists on a chart to be displayed, while still showing clearly which selection of these possible chord tones are to be played with no confusion. For example, when there are two chord tones on the 2nd string (b string), and two chord tones on the 5th (a string), using the standard fingering method by placing a finger number at the bottom of the strings, it is impossible to determine which of these two notes on that string is to be played. Using this fingering notation shown in FIGS. 17A-D and 31A-D makes it is very clear. This also allows the reader of the chart to see every possible way of playing the chord by selecting different combinations of all the possible chord tones shown, although fingering is indicated for only one of those possibilities, usually the most efficient.

Figure 16A:
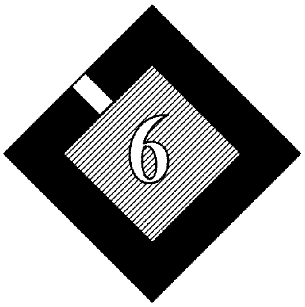
FIGS. 16A, 16B, 16C and 16D are examples of visual representation of symbols designating a scale tone according to the present disclosure.
Figure 16B:
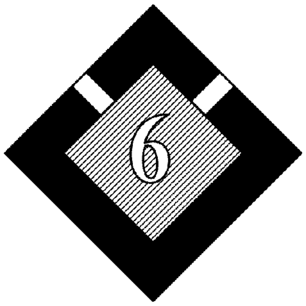
Figure 30A:
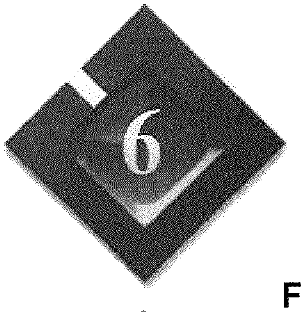
FIGS. 30A, 30B, 30C and 30D are the equivalent, in colors, of FIGS. 16A, 16B, 16C and 16D.
Figure 30B:
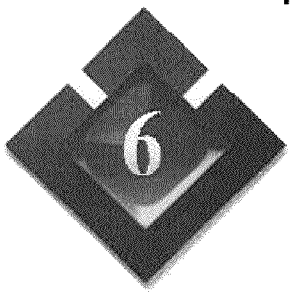

FIGS. 16A, 16B, 16C, 16D, 30A, 30B, 30C and 30D show different embodiments concerning the scale tone visual symbols used in FIGS. 7, 8, 10, 21, 22 and 24. In fact, on the scale tone visual symbols of FIGS. 16A-16D and 30A-30D, further indicate the best or most appropriate finger of the player to be used for playing the scale tone. In the present case, the finger is indicated not by an Arabic number but rather by means of a number of lines. Thus, FIGS. 16A and 30A (one line) designate finger 1 (index); FIGS. 16B and 30B (two lines) designate finger 2 (the middle finger), FIGS. 16C and 30C (three lines) designate finger 3 (the annular), and FIGS. 16D and 30D (four lines) designate finger 4 (the pinky).

Figures 2, 3:
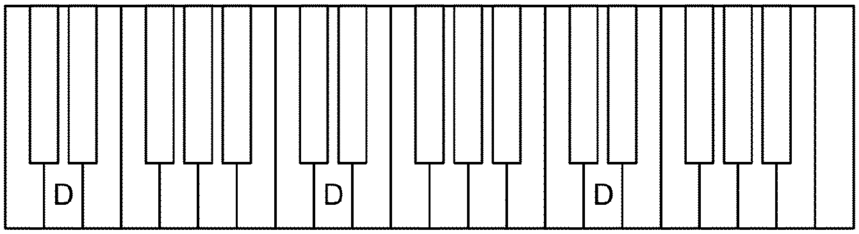
FIG. 2 (Prior Art)
FIG. 3 (Prior Art)

Several useful other information can be provided with the methods and systems of the present disclosure. This can be easily seen for example when comparing the tablature in FIG. 3 to FIG. 4 or to FIG. 18, describing the same notes. For FIGS. 4 and 18, a standard, repeating picking pattern is provided to the student. In FIGS. 4 and 18 the chord progression, time signature (in the pattern), bar line structure (vertical lines dividing time) and harmonic function (color of chords) are all communicated using less information than the tab.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

The invention claimed is:

1. A method of use, for a guitar player, of a music notation method for representing a location relationship between a given chord, its chord tones and the scale tones of the scale to which said given chord belong, on a visual representation of at least a portion of a guitar fretboard, said music notation method comprising:

assigning, to at least three chord tones of said given chord, predefined chord tone visual symbols comprising a first visual symbol designating a fundamental chord tone of said given chord, a second visual symbol designating a fourth overtone of said fundamental note, and a third visual symbol designating a second overtone of said fundamental note; and assigning, to said scale tones in said given position, predefined scale tones visual symbols comprising a fourth visual symbol designating the fundamental scale tone of said given position, a fifth visual symbol designating the third scale tone of said given position, a sixth visual symbol designating the fifth scale tone of said given position;

graphically superimposing said chord tone visual symbols and said scale tones visual symbols in order to show said location relationship;

graphically indicating, by means of numbers or numbers of lines disposed on said first, second and third symbols, fingers of said player to be used for playing said fundamental chord tone of said given chord, said fourth overtone of said fundamental chord tone, and said second overtone of said fundamental chord tone; and said method of use comprising:

placing said fingers of said player on a fretboard of a guitar in accordance with the numbers or numbers of lines disposed on said first, second and third symbols and playing said given chord on said guitar.

2. The method of claim 1, wherein said chord tone visual symbols are all represented by a first shape, and said scale tones visual symbols are all represented by a second shape adapted to receive therein said first shape, said first and forth visual symbols having both a same first color, said second and fifth visual symbols having both a same second color, and said third and sixth visual symbols having both a same third color.

3. The method of claim 2, wherein said first shape is a circle or dot and said second shape is a diamond.

4. The method of claim 3, wherein said first, second and third chord tone visual symbols further indicate a finger of said player for playing said chord tone designated by said symbol with a given number associated for each of the indicated fingers in such a manner that said first symbol comprises a first number that indicates a finger of said player for playing said fundamental chord tone of said given chord, said second symbol comprises a second number that indicates a finger of said player for playing said fourth overtone of said fundamental chord tone, and said third symbol comprises a third number that indicates a finger of said player for playing said second overtone of said fundamental chord tone; and placing said fingers of said player on a fretboard of a guitar in accordance with said indicated fingers and playing said fundamental chord tone, said fourth overtone and second overtone on said guitar.

5. The method of claim 1, wherein the method further comprises indicating, by means of numbers or numbers of lines disposed on said fourth, fifth and sixth symbols, fingers of said player to be used for playing said fundamental scale tone of said given position, said third scale tone of said position, and said fifth scale tone of said given position; and placing said fingers of said player on a fretboard of a guitar in accordance with the numbers or numbers of lines disposed on said fourth, firth and sixth symbols and playing said fundamental scale tone, said third scale tone and said fifth scale tone on said guitar.

6. A method of use, for a guitar player, of a visual representation of a guitar fretboard showing a location relationship between a given chord and its chord tones, the method comprising:

obtaining a graphical representation of at least a portion of a guitar fretboard and chord tone visual symbols, disposed on said at least a portion of said fretboard representation, and designating chord tones of said given chord, said visual symbols comprising a first symbol designating a fundamental chord tone of said given chord and located at a first location of said fretboard representation, a second visual symbol designating a fourth overtone of said fundamental chord tone and located at a second location of said fretboard representation, a third visual symbol designating a second overtone of said fundamental chord tone and located at a third location of said fretboard representation;

placing on a fretboard of said guitar a first finger of said player at a location of said fretboard corresponding to the first location of said fretboard representation;

placing on said fretboard of said guitar a second finger of said player at a location of said fretboard corresponding to the second location of said fretboard representation;

placing on said fretboard of said guitar a third finger of said player at a location of said fretboard corresponding to the third location of said fretboard representation; and playing said given chord on said guitar; and wherein said first, second and third chord tone visual symbols, each further indicates a finger of said player for playing said chord tone designated by said symbol in such a manner that said first symbol indicates the first finger of said player for playing said fundamental chord tone of said given chord, said second symbol indicates the second finger of said player for playing said fourth overtone of said fundamental chord tone, and said third symbol indicates the third finger of said player for playing said second overtone of said fundamental chord tone.

7. The method of use of claim 6, wherein said first, second and third chord tone visual symbols are each represented by a different color.

8. The method of use of claim 6, wherein said first, second and third chord tone visual symbols are each represented by a dot or circle of a different color.

9. The method of use of claim 8, wherein said first, second and third chord tone visual symbols, each further indicates a finger of said player for playing said chord tone designated by said symbol in such a manner that said first symbol indicates the first finger of said player for playing said fundamental chord tone of said given chord, said second symbol indicates the second finger of said player for playing said fourth overtone of said fundamental chord tone, and said third symbol indicates the third finger of said player for playing said second overtone of said fundamental chord tone.

10. The method of use of claim 8, wherein said symbols further indicate a finger of said player for playing said chord tone designated by said symbol with a given number of lines associated for each of the indicated fingers in such a manner that said first symbol comprises a first number of lines that indicates the finger of said player for playing said fundamental chord tone of said given chord, said second symbol comprises a second number of lines that indicates the second finger of said player for playing said fourth overtone of said fundamental chord tone, and said third symbol comprises a third number of lines that indicates the third finger of said player for playing said second overtone of said fundamental chord tone.

11. The method of claim 6, wherein the location relationship between said given chord and its chord tones are shown on the graphical representation of a full guitar fretboard, said given chord and its chord tones being expressed in five different forms, in a given key, and in five lengthwise positions of the guitar fretboard representation;

wherein the first finger of said player is placed at the first location of said fretboard based on a lengthwise position of the first location;

wherein the second finger of said player is placed at the second location of said fretboard based on a lengthwise position of the second location; and wherein the third finger of said player is placed at the third location of said fretboard based on a lengthwise position of the third location.

12. A method of use, for a guitar player, of a visual representation of a guitar fretboard showing a location relationship between a given position and its scale tones, said method comprising:

obtaining a graphical representation of at least a portion of a guitar fretboard and scale tone visual symbols, disposed on said at least a portion of said guitar fretboard, and designating scale tones of said given position, said visual symbols comprising a first symbol designating a fundamental scale tone of said given position and a first location of said given position, a second visual symbol designating a third scale tone of said given position and at a second location said given position, a third visual symbol designating a fifth scale tone of said given position and a third location of said given position;

placing on a fretboard of said guitar a first finger of said player at a location of said fretboard corresponding to the first location of said given position of said fretboard representation;

placing on said fretboard of said guitar a second finger of said player at a location of said fretboard corresponding to the second location of said given position of said fretboard representation; and placing on said fretboard of said guitar a third finger of said player at a location of said fretboard corresponding to the third location of said given position of said fretboard representation;

playing said scale tones of said guitar.

13. The method of use of claim 12, wherein said fundamental, second and third scale tone visual symbols are each represented by a diamond of a different color.

14. The method of use of claim 13, wherein said first, second and third scale tone visual symbols each further comprises an element indicating a finger of said player for playing said scale tone designated by said symbol in such a manner that said first symbol indicates the first finger of said player for playing said fundamental scale tone of said given position, said second symbol indicates the second finger of said player for playing said third scale tone of said given position, and said third symbol indicates the third finger of said player for playing said fifth scale tone of said given position.

* * * * *